(12) United States Patent
Waffner

(10) Patent No.: US 10,913,373 B2
(45) Date of Patent: Feb. 9, 2021

(54) CHARGING SYSTEM AND METHOD FOR OPERATING A CHARGING SYSTEM

(71) Applicant: Jürgen Waffner, Essen (DE)

(72) Inventor: Jürgen Waffner, Essen (DE)

(73) Assignee: innogy SE, Exsen (DE)

( * ) Notice: Subject to any disclaimer, the term of this patent is extended or adjusted under 35 U.S.C. 154(b) by 292 days.

(21) Appl. No.: 16/165,418

(22) Filed: Oct. 19, 2018

(65) Prior Publication Data
US 2019/0047435 A1    Feb. 14, 2019

Related U.S. Application Data

(63) Continuation of application No. PCT/EP2017/050244, filed on Jan. 6, 2017.

(30) Foreign Application Priority Data

Apr. 20, 2016 (DE) .......................... 10 2016 107 271

(51) Int. Cl.
*B60L 53/66* (2019.01)
*B60L 53/65* (2019.01)
(Continued)

(52) U.S. Cl.
CPC ............. *B60L 53/665* (2019.02); *B60L 53/65* (2019.02); *B60L 53/66* (2019.02); *B60L 53/68* (2019.02);
(Continued)

(58) Field of Classification Search
CPC ........ B60L 53/665; B60L 53/66; B60L 53/68; H02J 7/0071
(Continued)

(56) References Cited

U.S. PATENT DOCUMENTS 8,164,301 B2 * 4/2012 Uchida .................... B60L 58/12
320/109
9,401,611 B2 * 7/2016 Guillou ................... H02J 3/386
(Continued)

FOREIGN PATENT DOCUMENTS

DE    10 2011 008 675 A1    7/2012
DE    10 2013 002 078 A1    8/2013
(Continued)

OTHER PUBLICATIONS

Wikipedia, "State of Charge", internet article https://en.wikipedia.org/w/index.php?title=State_of_charge&oldid=655675001#Current_integration_method, Apr. 9, 2015, 3 pages.
(Continued)

*Primary Examiner* — Richard V Muralidar
(74) *Attorney, Agent, or Firm* — Reinhart Boener Van Deuren P.C.

(57) ABSTRACT

A charging system including means designed to detect the charging state of a traction battery of an electric vehicle, determination means for determining a charging curve for the traction battery starting from the detected charging state of the traction battery, and calculation means designed to calculate a charge profile which is formed from at least two time intervals with a respective interval-specific constant electric power. The charging curve defines the respective electrical power within a time interval.

14 Claims, 5 Drawing Sheets

(51) Int. Cl.
*B60L 53/68* (2019.01)
*H02J 7/00* (2006.01)
*B60L 58/12* (2019.01)

(52) U.S. Cl.
CPC ............ B60L 58/12 (2019.02); H02J 7/0071 (2020.01); *B60L 2240/549* (2013.01); *B60L 2240/80* (2013.01); *B60L 2260/50* (2013.01); *Y02T 10/70* (2013.01); *Y02T 10/7072* (2013.01); *Y02T 90/12* (2013.01); *Y02T 90/14* (2013.01); *Y02T 90/16* (2013.01); *Y02T 90/167* (2013.01); *Y04S 30/12* (2013.01); *Y04S 30/14* (2013.01)

(58) Field of Classification Search
USPC .......................................................... 320/109
See application file for complete search history.

(56) References Cited

U.S. PATENT DOCUMENTS

| 2013/0110296 | A1 | 5/2013 | Khoo et al. |
| 2013/0140883 | A1* | 6/2013 | Tawada ............. H02J 13/00016 307/9.1 |
| 2014/0167678 | A1 | 6/2014 | Guillou et al. |
| 2014/0225572 | A1 | 8/2014 | Rousselle et al. |
| 2020/0207236 | A1* | 7/2020 | Skrbic .................... B60L 53/67 |

FOREIGN PATENT DOCUMENTS

| DE | 10 2012 011 773 A1 | 12/2013 |
| DE | 10 2013 010 774 A1 | 12/2014 |
| DE | 10 2013 211 265 A1 | 12/2014 |
| EP | 2 662 949 A1 | 11/2013 |
| WO | WO 2013/014238 A2 | 1/2013 |
| WO | WO 2013/023694 A1 | 2/2013 |

OTHER PUBLICATIONS

Anonymous, "Measure Li-ion cell capacity with an Arduino", internet article https://web.archive.org/web/20160416090217/https://www.instructables.com/id/Arduino-cell-capacity-meter/, Apr. 16, 2016, 10 pages.

Terry Cleveland et al., "Developing Affordable Mixed-Signal Power Systems for Battery Charger Applications," Jun. 24, 2015, 11 pages; URL: https://web.archive.org/web/20150724033559/http://www.microchip.com/stellent/groups/designcenter_sg/documents/market_communication/en027883.pdf.

Wikipedia, "Integral," Apr. 10, 2016, 26 pages; URL: https://en.wikipedia.org/w/index.php?title=Integral&oldid=714610718.

* cited by examiner

CHARGING SYSTEM AND METHOD FOR OPERATING A CHARGING SYSTEM

CROSS-REFERENCE TO RELATED PATENT APPLICATIONS

This patent application is a continuation of PCT/EP2017/050244, filed Jan. 6, 2017, which claims priority to German Application No. 10 2016 107 271.0, filed Apr. 20, 2016, the entire teachings and disclosure of which are incorporated herein by reference thereto.

FIELD

The subject matter relates to a charging system, in particular for electric vehicles, and a method for operating such a charging system.

BACKGROUND

The charging of electric vehicles, in particular the charging of traction batteries of electric vehicles, has been known for many years. With the expansion of the charging infrastructure, issues are increasingly arising in relation to the correct billing of services. As a rule, when charging with alternating current the energy provided is measured with a meter calibrated for the purpose in a charging station. The energy measured is then billed to the user of the charging station at an agreed tariff. However, in the event of charging with direct current, the measurement technology is complex and not produced on a large scale, meaning that measurement of the electrical energy provided when charging with direct voltage involves high investment costs.

It is likewise known that billing can take place on a time basis. However, with such time-based billing, it has previously been assumed that throughout the entire charging process the same electrical power is always made available. This assumed electrical power is multiplied by the time the charging process take to give the electrical energy that has been made available. However, this billing model is inaccurate, since a charging control unit within an electric vehicle always follows a charging curve, along which the electrical power drawn varies at different times. In particular, the electrical power that is drawn decreases with the duration of the charging process.

For this reason, the problem for the subject matter was to provide time-based billing, having high accuracy of the measured electrical energy.

BRIEF SUMMARY

This problem is solved objectively by a charging system and method according to the present disclosure.

It has been recognized that with time-based billing as a rule the relationship between the electrical energy billed and that actually made available is extremely uncertain. It has also been identified that prior to a charging process there is generally sufficient information available to match the charging process to a charging curve, in particular of an electric vehicle, and thus calculate in advance the actual quantity of energy which will be made available up until completion of the charging process. Of initial interest here, is the current charging state of the battery. This charging state, also referred to as a charging point, is indicative of the further course of the charging process. The charging point generally indicates the remaining residual capacity of the battery. The charging point is also dependent on the current state of the battery, the battery temperature, the age of the battery, and so on. A charging point can be obtained by a measuring device arranged at the battery. It is also possible for the obtaining of the charging point to be performed by a measuring device spatially detached from the battery. The battery can be arranged in an electric vehicle. A charging control unit for charging the battery can also be arranged in the electric vehicle.

However, the battery can also be used as a photovoltaic (PV) storage device. Here also, a charging control unit can be used, which monitors and controls the charging process of the battery. A PV storage device can, for example, be arranged in a house, and fed via the PV system of the house. However, it is also possible for the battery to be fed from a PV system of another house and the billing to be carried out between the two households concerned.

Detection means are proposed according to the subject-matter, with the help of which a state of charge of a battery is detected. The detection means in question do not just include those measuring devices arranged directly at a battery. Moreover, detection means can also be arranged in a charging station or a mobile device and receive information on the charging state. Receipt is also understood to be detection of the charging state according to the subject-matter.

Besides the knowledge of the state of charge, knowledge of the charging curve of the charging control unit or the battery to be charged is necessary, for estimating the course of a charging process. With the help of a charging curve it is generally established in a charging control unit, at what electrical power and for what state the battery is charged. The charging curve generally runs with a monotonous decrease. A battery can have a charging point between 100% and 0%. The 100% charging point means that the battery has fully discharged. In this case, the entire charging curve is followed to charge the battery. With the changing state of the battery, thus with increasing charging, generally the battery is charged with correspondingly decreasing amperage. This charging behaviour is reflected in the charging curve. If, for example, the charging point is 0%, this can mean that the battery is fully charged, and the charging curve has been followed completely.

At this point it is noted that the figures of 100% and 0% are given merely as examples. During a charging process, the charging curve is generally followed, viewed from the current state of the battery, until the end of the charging process, and thus until complete charging of the vehicle, or until the charging process is interrupted.

In the knowledge of the charging curve, a charging strategy can then be developed. For this reason, determination means are proposed with which a charging curve can be determined. The charging curve for a prevailing charging process can always be determined starting from the detected state of charge. Generally, the charging control unit stores the charging curve with which a battery is charged. This information can also be stored externally to the vehicle, by way of example in a database. To determine the charging curve, either the charging control unit or a device remote from this can be used. In particular, the determination means can be arranged in a charging station or a mobile terminal. The determination means can load the corresponding information for determination of the charging curve.

In the knowledge of the charging state and the charging curve, a charging point on the charging curve can be determined. Based on this charging point, a charge profile can be calculated. To this end, calculation means can be provided. The calculation means can be arranged in the vehicle, the charging control unit, a charging station remote from this or a mobile terminal. To allow time-based billing, the charge profile is divided into intervals, each of which lasts a certain time and each of which has an interval-specific electrical power. This means that the charge profile consists of a plurality of sequential time intervals, each time interval of which preferably has a different interval-specific power. It is thus possible, for each time interval, to calculate the electrical energy made available. To ensure that the electrical power made available in each individual time interval is also requested by the battery, while the charging curve is being followed, it is proposed that the charging curve limits the respective electrical power of a time interval.

The calculation means can also determine the charge profile depending on external conditions. Thus, for example, a forecast progress line of a generator, e.g. a feed of electrical power from a renewable source can, by way of example, be used to determine at least parts of the charging curve. A generator can, for example, be a photovoltaic system, a wind turbine, a biomass power station, a cogeneration plant, or similar. In particular, a progress line of a photovoltaic system can be forecast relatively accurately using a weather forecast and historical progress lines. If the progress line of a generator is known, the charge profile can be matched to this. In particular, the starting time of the charging process can be time shifted, in particular delayed, if the progress line forecasts the generation of electrical power.

Because the charging curve limits the respective electrical power of a time interval, it is ensured that the electrical power made available at any point in time does not exceed the electrical power requested from the charging control unit. In particular, it is ensured that the electrical power requested from the charging control unit is always made available. The time intervals are used to calculate the electrical energy made available. A measurement of the electrical power is no longer necessary. It is thus possible, without a dedicated measurement of the electrical power requested during the charging process, to determine the electrical energy made available and to calculate a charging tariff accordingly.

The time intervals can be understood visually as a sequence of "energy plates", wherein in each time interval a constant electrical power is made available for a certain time, and from this the electrical energy for a time interval results. Thus, through the calculation means, a predefined energy can be calculated from power and time which corresponds approximately to the charging curve.

The charging process is then performed using the charge profile, which can also be understood to be a timetable.

It is also possible to re-determine the charging point upon completion of each interval and adapt the charge profile using the charging point then determined. This can be advisable in particular if for the determination of the charge profile, the external conditions, such as the progress line of a generator, have been used, since the actual electrical power may not correspond to the forecast power in an interval. The charging point is then different from that forecast and the charge profile may have to be adapted.

According to an embodiment, it is proposed that the detection means receive information on the state of charge of the battery, in particular from an electric vehicle, or from a user interface. The state of charge of a battery can be determined by a charging control unit, e.g. within an electric vehicle. In particular, through determination of the battery temperature, the battery voltage and the battery current, the so called State of Charge (SOC) can be determined. From this information, the state of charge can be deduced. This information can be made available to the detection means. The detection means do not necessarily have to be arranged in the electric vehicle, but can, by way of example, also be installed in a charging station or a mobile terminal, by way of example a mobile telephone, a tablet computer or similar.

It is also possible for the state of charge to be entered via a user interface. Thus, it is, by way of example possible for a user to have a state of charge display in a vehicle. This state of charge display can be used by the user to manually enter the charging state via a user interface. This manual entry can similarly be made available to the detection means. In the case of entry via a mobile device, it may be possible that the detection means are arranged directly there. It can also be possible for the state of charge to be transmitted by the mobile device to a charging station.

According to an embodiment, it is proposed that the determination means receive information on a type of battery or from a user interface. So, just as the charging state can be detected either in the vehicle itself or externally to it, by way of example, via a user interface, a type of battery can also be detected. That stated above applies here as appropriate. The type of battery allows the determination means to determine a charging curve. The charging curve is generally at least dependent on the type of battery and can vary for different batteries. In the knowledge of the type of battery, the determination means can, by way of example, load a charging curve from a memory. The memory can, by way of example, also be made available by a remote computer spatially detached from the determination means. Via data communication, depending on the type of battery, a charging curve can be loaded from a remote computer.

According to an embodiment, it is proposed that the determination means, depending on the type of battery, load a charging curve from a memory. By way of example, a lookup table can be stored, from which it can be seen for which type of battery each charging curve is intended. A correspondingly determined charging curve can be loaded from the memory by the determination means.

According to an embodiment, it is proposed that the detection means, the determination means and the calculation means are arranged in a charging station or in a mobile communication device. It is possible for the timetable or the charge profile to be calculated in the charging station. To this end it is expedient if at least the determination means and the calculation means are arranged in the charging station. The detection means can also be arranged in the charging station. It is also possible for the detection means, the determination means and the calculation means to have a distributed arrangement, thus, by way of example, with the calculation means arranged in the charging station and the detection means, as well as the determination means, in a mobile terminal. In particular, the detection means, the determination means and/or the calculation means can be modelled as an App of a mobile communication device. To this end, a computer program is proposed in which the detection means, the determination means and/or the calculation means are implemented.

The computer program can run on a mobile terminal and, by way of example, generate a user interface, via which the state of charge of the battery can be entered. A type of battery or a type of a vehicle can also be entered via the user interface, from which the type of battery can then be determined. The determination means can be programmed in the computer program in such a way that in the knowledge of the type of battery, via a wide area network, in particular wirelessly, an external memory can be accessed and the corresponding charging curve loaded.

It is possible that the computer program is designed to transmit the loaded charging curve, together with information on the state of charge either to calculation means, by way of example in a charging station, or that the calculation means are implemented directly in the computer program. The calculated charging curve can be transmitted, by way of example, from the mobile communication device, by way of example to the charging station or the charging control unit, e.g. in the electric vehicle. The communication between a mobile communication device, charging station and charging control unit can, by way of example, take place wirelessly, by way of example via near-field communication, Bluetooth, WLAN, GSM, UMTS or similar.

According to an embodiment, it is proposed that the charge profile comprises a plurality of time intervals. The greater the number of time intervals, the more accurately the time intervals will map the charge profile. The time intervals can be understood as time-discrete sample points of the charging curve.

It has been found that the length of the time intervals can advantageously be between 1 minute, 5 minutes and 15 minutes. It is also possible for the duration of the time interval to be variable. In particular, the duration of the time interval can be inversely proportional to the rise in the charging curve. This means that when the charging curve experiences major changes in power in a short space of time, the time intervals are then shorter than at times when the charging curve demonstrates a substantially constant power. This ensures that via the time interval the charging curve can be reflected precisely, leading to accurate billing of the electrical energy made available.

For each time interval a maximum charging power is determined. The maximum charging power is generally such that in a time interval the charging power is always below the charging curve. This ensures that the energy billed is never greater than the energy actually made available. It can be ensured that for each time interval, the power requested is below or the same as that which is determined by the charging curve.

For each time interval, the product of the time and maximum power is calculated. This product represents the electrical energy made available in a time interval. The energy calculated in this way is added up for all time intervals and a total energy is calculated. The electrical energy resulting from this is provided as information, with which the billing can then be performed.

According to an embodiment, it is proposed that the calculation means receive information on a maximum charging current. It is recognised that using the charging curve, electrical powers can be determined which are determined by the electrical voltage and the electrical current. However, the level of the charging current can be a particular problem as, by way of example, the charging current cannot be carried by all components involved in the charging process. Thus, by way of example, it is possible for a charging cable to be designed for a maximum charging current only, which is lower than the maximum charging current resulting from the charging curve. This is of particular relevance if the charging voltage is low.

To ensure that the calculation means determine the time intervals in such a way that the respective interval-specific electrical power can also be requested, in particular that the charging current can be passed through the components involved without damage, the calculation means receive the information on the maximum charging current. In doing so, the information on the maximum charging current can, by way of example, be provided by a querying means in the charging station for the respective charging cable. A charging cable can, by way of example, be coded via a resistor in such a way that via this the maximum charging current flowing through the cable can be determined. This information can be made available. With the help of the calculation means, the maximum power per time interval can be calculated in such a way that the maximum charging current is not exceeded.

According to an embodiment, it is proposed that with the help of the charge profile, the charging station determines a maximum charging current. As already explained, the charging station can determine the maximum charging current from the charging cable connected to it. It can, by way of example, also be detected through communication with the electric vehicle or the charging control unit, what maximum charging current the electric vehicle or the charging control unit can carry. With the help of the charge profile, the charging station can determine a maximum charging current. It is possible that the charge profile is calculated outside of the charging station and received in the charging station. This is, in particular, the case when the charge profile is calculated in a mobile terminal. The charging station can check if the charging set connected to the charging station and/or a charging control unit and/or electric vehicle connected to the charging station are designed for the maximum current. Only if the maximum charging current is confirmed, the charging process can be started.

It is also possible that the charging station receives the charge profile and depending on the charge profile received, controls a charging control unit, e.g. in an electric vehicle. It is also possible that the charge profile is calculated in the charging station. Through communication with the electric vehicle or a charging control unit, for example within the electric vehicle, the charging station can ensure that the charging control unit performs the charging process according to the charge profile. To this end, by way of example, communication can take place via the pilot wire of a charging set between the charging station and the charging control unit. Via the pilot wire, the charging station, for each time interval, e.g. at the start of each time interval, can notify to the charging control unit the respective interval-specific charging current. The charging control unit then adjusts the charging current according to the charge profile and charges for the duration of the time interval with the corresponding charging current. The charging station thus contains the control function for the charge profile and the charging control unit follows the charge profile solely depending on information from the charging station.

On the other hand, it is also possible that the charging control unit knows the charge profile and controls charging process depending on the charge profile. In this case, by way of example, communication between charging station and charging control unit regarding the respective interval-specific power or the interval-specific current can be dispensed with. The charging control unit can either calculate the charge profile itself or, by way of example, receive it from a mobile terminal or the charging station. The charging control unit can then follow this charge profile. The information, which is relevant to the billing, can be calculated, made available and, by way of example, transmitted to a billing centre by the device that calculated the charge profile.

It is also possible that the charging control unit and the charging station know the charge profile. The charge profile can in this case be calculated either in a mobile terminal, the charging station and/or the charging control unit. If the charge profile is known both in the charging control unit and in the charging station, the charging control unit can follow the charge profile during the charging process. The charging station can check if the charging control unit is keeping to the specified charge profile. In this way it can be ensured that the charging control unit does not request more electrical power than specified by the charge profile. In the event of exceeding a power in a time interval, the charging station can interrupt the charging process, because then the billing of the electrical energy no longer corresponds to that which would have been made available to the charging station.

It is also possible that the charge profile is known in the charging control unit. Then the charging control unit can send the charge profile or information on a maximum charging current depending on the charge profile to the charging station. In particular, the charging control unit can transmit a charging request with the maximum charging current to the charging station. This transmission can take place in a wireless or wired manner, in particular also via a pilot wire. If the charging station signals that it can make available the maximum charging current, the charging readiness is signalled to the charging control unit and the charging control unit can perform the charging process.

Billing means can be provided which receive information on a certain electrical energy. The electrical energy determined has been calculated from the time intervals. The billing means can be arranged either in a mobile terminal or the charging station. It is also possible for the charging means to be arranged remotely from this, by way of example in a billing centre. With the help of the information on the determined electrical energy, billing-relevant data can be calculated.

The shorter the time intervals are, the more accurately the charging curve will be modelled. On the other hand, the number of time intervals should be limited, so as not to alter the charging process too frequently. By a suitable choice of the length or number of time intervals, it is ensured that the electrical energy per time interval determined from the charge profile corresponds approximately to the electrical energy determined from the charging curve for the corresponding time interval. Preferably, the electrical energy per time interval determined from the charge profile is somewhat less than the electrical energy determined from the charging curve for the corresponding time interval. This can be because the charging curve for each time interval places an upper limit on the maximum power.

In particular, it has found to be advantageous if the charging curve envelopes the charge profile. The charging curve thus always represents the upper limit for an electrical power per time interval at the end of a respective time interval. This means that at the start of a time interval, the electrical power according to the charging curve is above the electrical power, which has been determined on an interval-specific basis. At the end of the time interval, advantageously the interval-specific electrical power is equal to the relevant electrical power at this charging point of the charging curve.

A charging control unit is generally operated with various power stages. The power stages can be stored statically or dynamically in the charging control unit. In particular power steps, by way of example 12 kW, 11.5 kW, 11.3 kW, 11 kW, 10 kW and so on, can be stored in increments in the charging control unit. The power stages of the charging control unit can be ascertained, and the charge profile can determine an electrical power per time interval, corresponding to one of the power stages ascertained. It is thus ensured that the charge profile can be precisely modelled by the charging control unit.

For billing, the total of the electrical energy determined from the time intervals is determined and made available as billing-relevant information.

BRIEF DESCRIPTION OF THE DRAWINGS

Below, the subject matter is explained in more detail using a drawing showing exemplary embodiments. The drawing shows as follows.

DETAILED DESCRIPTION

Figure 1:
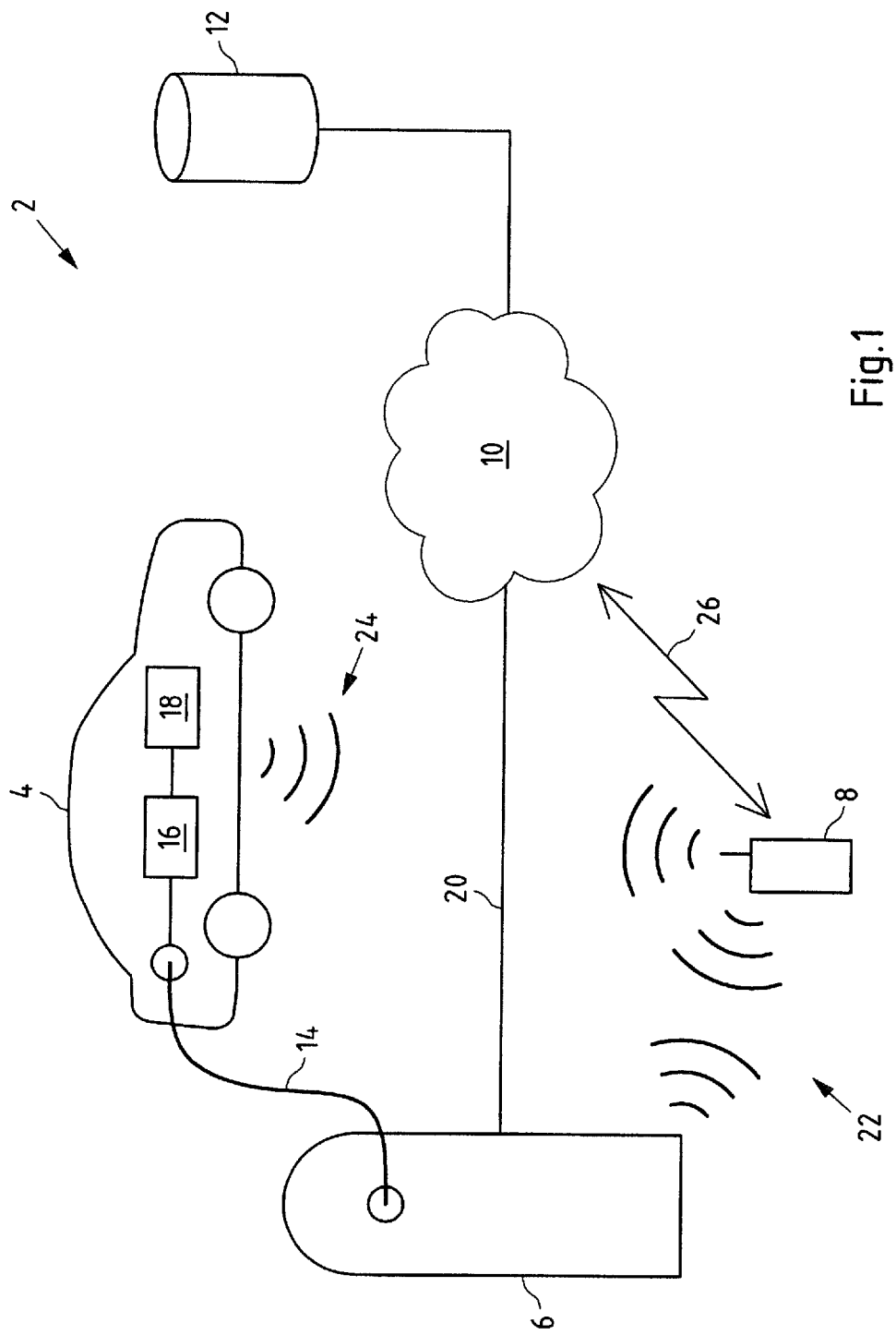
FIG. 1 shows the structure of the charging system of the subject matter.

FIG. 1 shows a charging system 2 with an electric vehicle 4, a charging station 6, a mobile terminal 8, a wide area network 10 and a server 12.

The electric vehicle 4 connected to the charging station 6 via a charging cable 14. In the electric vehicle 4 a charging control unit 16 and a battery 18 can be arranged.

The charging station 6 is, by way of example, connected via a communications link 20, in either a wired manner or wirelessly via the wide area network 10, with the server 12.

Between the charging station 6 and the mobile terminal 8, a radio communication 22, by way of example by means of Bluetooth, WLAN, NFC or similar can take place. Between the mobile terminal 8 and the electric vehicle 4 a radio link 24 using one of the stated protocols can take place. In particular, via this protocol, the radio link 24 between the charging control unit 16 and the mobile terminal 8 takes place.

A radio link (not shown) can also be established between the charging station 6 and the electric vehicle 4 or its charging control unit 16 according to the stated protocols.

Finally, the mobile terminal 8 can be connected via a radio link 26 and the wide area network 10 with the server 12.

Figure 2:
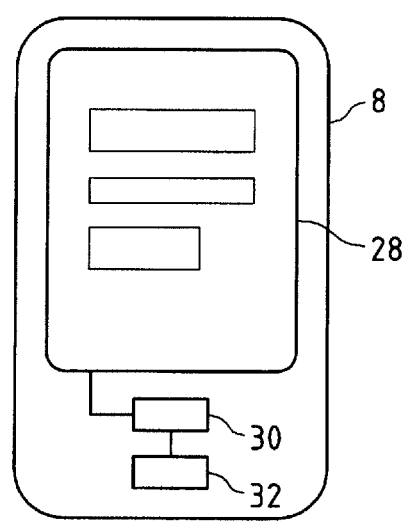
FIG. 2 shows a mobile terminal designed to carry out the method of the subject matter.

The mobile terminal 8 according to FIG. 2 can be designed to perform the method of the subject matter. In the mobile terminal 8, a user interface 28, by way of example a touch display as well as a microprocessor 30 and a memory 32 can be arranged. A computer program can be stored in the memory 32, which can be loaded via the microprocessor 30. The computer program can contain the detection means, the determination means and the calculation means. To begin with, by means of the detection means, the microprocessor can be controlled in such a way that via the user interface 28, the user is asked what the charging state of the battery 18 is. The user can, by way of example read what this charging state is from a display in the electric vehicle 4 and enter this via the user interface 28, by way of example a touch display. Then the computer program can control the processor 30 in such a way that via the user interface 28 it asks the user for the type of electric vehicle 4 or the type of battery 18. In turn, via the user interface 28, the user can then enter the type.

Next, the determination means in the computer program can prompt the processor to establish a mobile communication via the radio link 26 and the wide area network 10 with the server 12. Via this connection 26, information on the type of battery is transmitted to the server 12. There, depending on the type, a charging curve is loaded from a memory and via the communications link 26 transmitted to the mobile terminal 8.

Thus, in the mobile terminal 8, in addition to the charging point, the charging state of the battery, and also the curve for this battery 18, are therefore known. Then, based on the charging state, using the charging curve of the processor 30, the computer program or its authorisation means, can be instructed to calculate a charge profile. Such a charge profile is shown in FIGS. 4b and c and is discussed below.

Via the radio link 22, the mobile terminal 8 can transfer the calculated charge profile, by way of example, to the charging station 6. Via the radio link 24, the mobile terminal 8 can transfer the charge profile to the electric vehicle 4 or the charging control unit 16.

If the charge profile, by way of example, is known in the charging station 6, in the charging station 6 the maximum charging current can be determined to start with from the charge profile. The charging station 6 can ask whether the charging station 6 can charge at this maximum charging current. To this end, the charging station 6 can, by way of example, ask the charging cable 14 whether this is designed for the maximum charging current. This can, by way of example, take place by asking for a resistance coding of the charging cable 14.

It is also possible for the charging station 6 to ask the charging control unit 16 about the readiness to charge with the maximum charging current via the charging cable 14. If the charging control unit 16 signals its readiness to charge, the charging station can initiate the charging process. During this charging process, the charging station 6, via the charging cable 14 or via other communication with the charging control unit 16, can notify for each time interval the charging current or the charging power. The charging control unit 16 can set the charging current accordingly and request electrical power from the charging station 6 according to the charge profile via the charging cable 14.

It is also possible for the mobile terminal 8 to transmit the charge profile via the radio link 22 to the charging station 6 and via the radio link 24 the charge profile to the charging control unit 16. It is then no longer necessary for the charging station 6, following signalling of the charging readiness, to notify the charging control unit 16 of the charging power or charging current to be charged at for the respective time interval.

It is also possible for the mobile terminal 8, via the radio link 24, to transmit the calculated charge profile only to the charging control unit 16 of the electric vehicle 4.

In the charging control unit 16, a maximum charging current can be calculated from the charge profile. Then, the charging control unit 16, via the charging cable 14, can ask the charging station 6 whether the charging station 6 is designed for providing the maximum charging current. Accordingly, the charging control unit 16 can also ask, by way of example via a resistance coding, whether the charging cable 14 is suitable for the maximum charging current. If it is, the charging control unit 16 can request a charging approval and carry out the charging process according to the charge profile.

Once the charging station 6 and the electric vehicle 4 have begun the charging process, the charging station 6 or the electric vehicle 4 can signal to the mobile terminal 8 the commencement of the charging process. An end of the charging process can be signalled accordingly to the mobile terminal 8. The mobile terminal 8 can send the charge profile via the radio link 26, to the server 12, through billing-relevant data calculated by the processor 30. In the server 12, upon receipt of the charge profile, with the help of billing means the electrical energy made available can be determined, and from this billing-relevant data, which can then be billed at an agreed tariff.

In this connection, it is worth noting that the entire charge profile does not always have to be followed. Instead, the charge profile is followed until the end of a charging process. In this case, it can be checked which time intervals of the charge profile have actually been requested and the actual billing-relevant data, in particular the electrical energy actually made available can be calculated.

Figure 3:
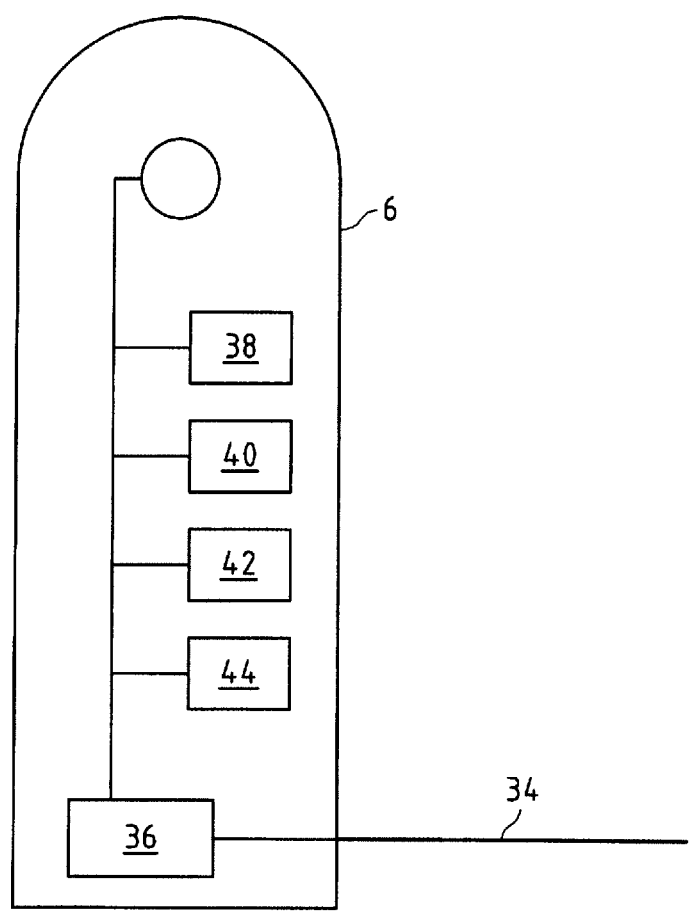
FIG. 3 shows the structure of a charging station of the subject matter.

Just as it is possible to calculate the charge profile in the mobile terminal 8 by means of the computer program, the charge profile can also be calculated in the charging station 6. The charging station 6 is, as shown in FIG. 3, electrically connected to a local distribution network 34. Via suitable charging electronics 36, the charging station 6 can control the charging process. In addition to the conventional charging electronics 36, in the charging station 6, detection means 38, determination means 40, calculation means 42 and communication means 44 can be arranged. The determination means 38 can capture via a communication link from the charging cable 16, by way of example the charging state. It is also possible for the detection means 38 to receive the charging state, which by way of example has been entered by the user, from the mobile terminal 8.

The determination means 40 can load the charging curve from a memory installed in the charging station 6. It is also possible for the determination means 40 to receive the charging curve from the charging control unit 16, via a radio link or the charging cable 14. The determination means 40 can also receive the charging curve via the communication link 20 from the server 12.

The calculation means 42 can calculate the charge profile in the knowledge of the charging curve and the charging state.

With the help of the communication means 44, the charge profile or billing-relevant data can be transmitted via the communication link 20 to the server 12.

Once the calculation means 42 have determined the charge profile, the calculation means 42 can instruct the charging electronics 36 to communicate with the charging control unit 16 so that the latter follows the charge profile according to the calculation. At the end of the charging process, the calculation means 42 can calculate the electrical energy actually made available by adding up the actual intervals being passed through and by means of the communication means 44 send this to the server 12 as billing-relevant data. In the server 12, billing of the energy made available can then take place.

A distribution of the detection means 38, determination means 40 and calculation means 42 between the mobile terminal 8 and the charging station 6 is possible. Some of these may also be formed in the charging control unit 16. It is also possible for the functions described above in relation to the mobile terminal 8, to be performed in the charging control unit 16.

Figure 4A:
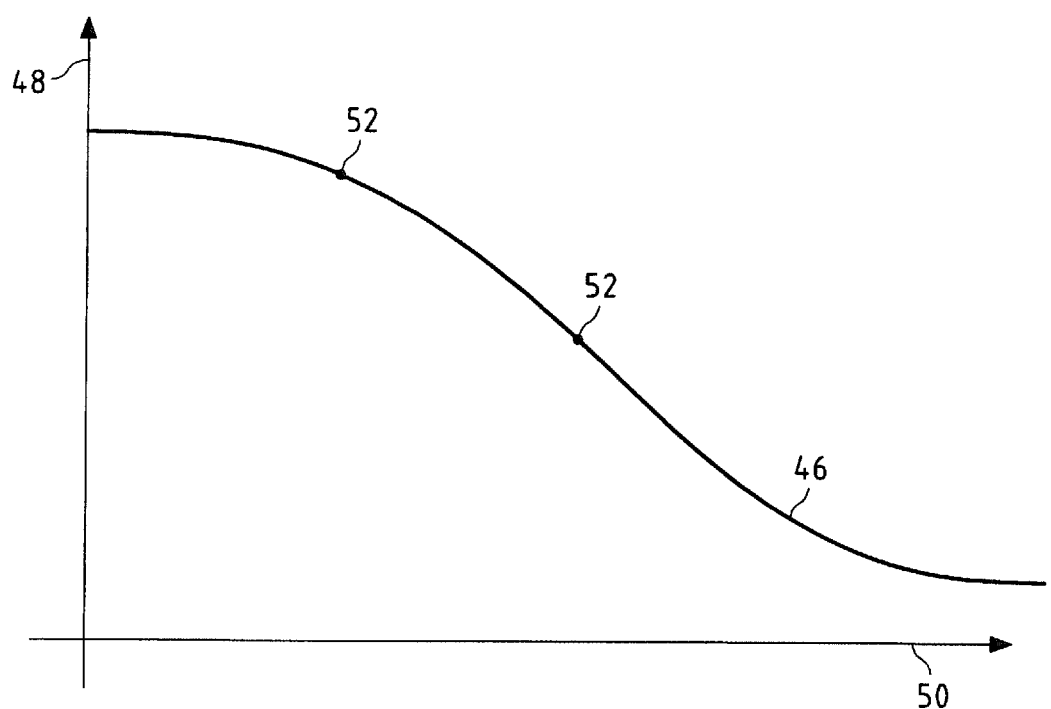
FIG. 4a shows the course of a charging curve.
Figure 4B:
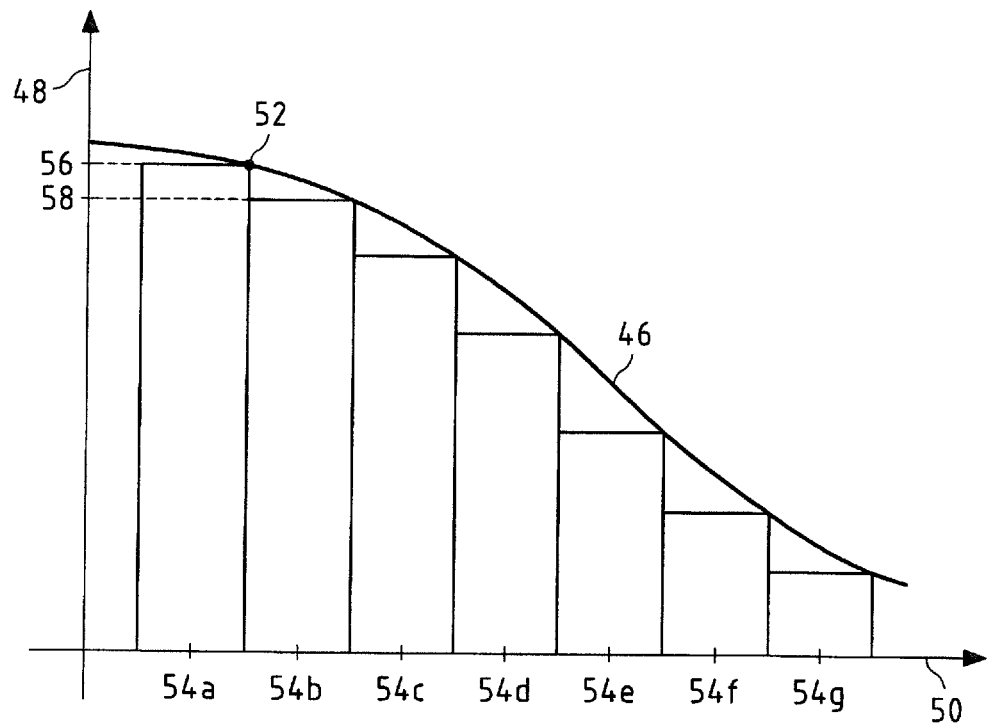
FIG. 4b shows the course of a charge profile with constant time intervals.

FIG. 4a shows a charging curve 46. The charging curve 46 shows the course of the charging power 48 as a function of time 50. The charging curve 46 has been followed, if the battery 18 has been charged from being fully discharged to fully charged.

Depending on a charging state of the battery 18, charging points 52 on the charging curve 46 can be determined. The charging points 52 can be determined depending on the relative charging state of the battery 18. Depending on what the charging state is, a charging point 52 is arranged on the charging curve 46.

Once a charging state has been captured, a charging point 52 can be determined on the charging curve 46. As soon as a charging point 52 has been determined, as shown in FIG. 4b, a plurality of time intervals can be determined. In particular, the length of the respective time intervals 54 is constant. The maximum power 56 can be determined via the charging point 52. This maximum power 56 determines the interval-specific power of a time interval, here the first, 54a. For the next time interval 54b, it is determined what the electrical power 58 at the time of the end of the interval 54, depending on the charging curve 46, will be, and the maximum interval-specific power 58 will be calculated for the entire interval 54. This is carried out for all intervals 54a-g. The total of intervals 54a-g constitutes the charge profile.

It can be seen that, for each interval, an interval-specific power 56, 58 has been calculated. It can also be seen that the charging curve 46 places a limiting envelope around the intervals 54a-g and an electrical power 56, 58 of each of the intervals 54a-g is always below the electrical power of the charging curve 46. The power 56, 58 corresponds to the electrical power specified by the charging curve 46 at the end of interval 54a-g, at the outside.

The electrical energy made available can be calculated from the length of the interval 54a-g multiplied by the respective interval-specific power 56, 58. Adding up the intervals 54a-g gives the electrical energy made available. This information can be made available to the server 12, so that it can calculate billing-relevant data, by means of billing means.

Figure 4C:
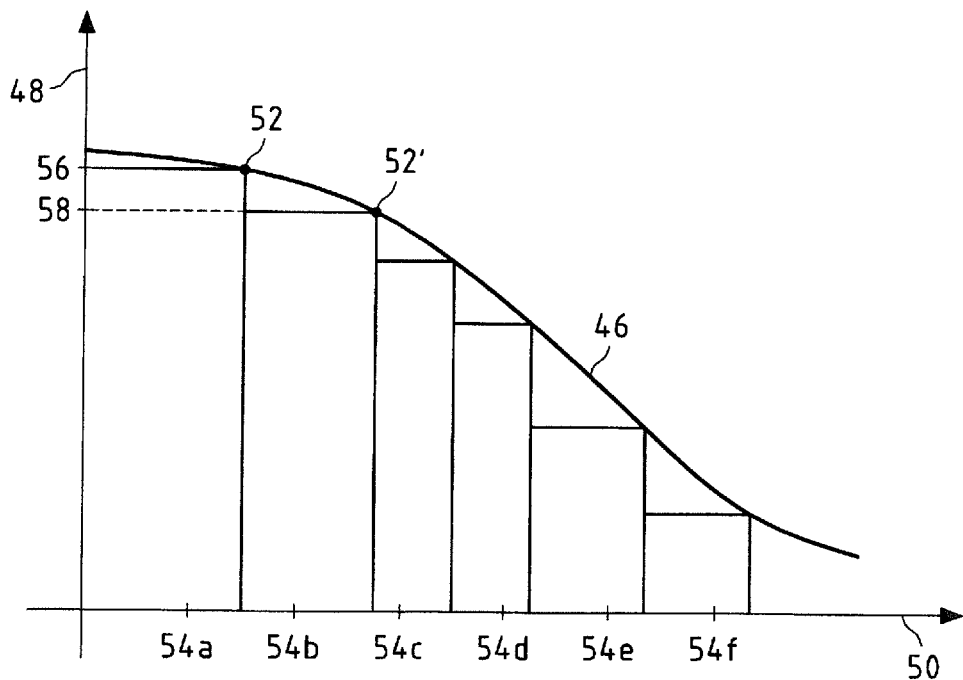
FIG. 4c shows the course of a charge profile with variable time intervals.

FIG. 4b shows intervals 54a-g of equal length, but it is also possible, for the intervals to be of varying length, as shown in FIG. 4c.

The slope of the charging curve 46 varies and may, by way of example, be flatter at the start and at the end of a charging process, than in the middle of a charging process. The length of an interval 54a-f may depend on the slope of the charging curve 46. For charging point 52, the gradient of the charging curve 46 is determined and from this the length of the time interval 54a. It is then determined for the charging point 52, what the amount of electrical power 56 for the interval 54a is.

Then the gradient of the charging curve 46 is calculated on the other side of the charging point 52 and, from this gradient, the length of the time interval 54. If the length of the time interval 54 is known, then a new, virtual charging point 52' is determined. This charging point determines the maximum electrical power 58 for the interval 54b. This process is carried out for the further intervals 54c-f and from this the charge profile shown is calculated.

By calculating the charge profile, it is possible, without performing a current measurement, to ensure precise billing of the energy made available.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A charging system, comprising:
    detection means arranged to detect a state of charge of a battery, in particular a traction battery of an electric vehicle;
    determination means arranged to determine a charging curve for the battery on the basis of the detected state of charge of the battery; and
    calculation means arranged to calculate a charge profile, formed from at least two time intervals, each with an interval-specific, constant electrical power,
    wherein the charging curve limits the respective electrical power within a time interval, wherein the calculation means sum the respective products of time per interval and the interval-specific power over at least two intervals and determine the resulting energy therefrom and provide information about the determined electrical energy,
    wherein the charging curve envelopes the charging profile, such that at the end of each interval the interval-specific power equals the power provided by the charging curve.

2. The charging system according to claim 1, wherein the detection means receive information on the state of charge from:
    A: the battery or,
    B: a user interface.

3. The charging system according to claim 1, wherein the determination means receive information on a type of the battery, and the determination means, depending on the type of battery, load a charging curve from a memory.

4. The charging system according to claim 1, wherein the calculation means receive information on a maximum charging current and a maximum power for one of the time intervals depending on the maximum charging current.

5. The charging system according to claim 1, wherein the detection means, the determination means, and the calculation means are arranged in a charging station or in a mobile communication device.

6. The charging system according to claim 1, wherein the charge profile comprises a plurality of time intervals and/or wherein, for each time interval, a maximum charging power is determined.

7. The charging system according to claim 1, wherein a charging station receives the charge profile and depending on the charge profile received controls a charging control unit.

8. The charging system according claim 7, wherein the charging station, with the help of the charge profile, determines a maximum charging current and wherein the charging station checks if the charging set connected to the charging station and/or a charging control unit and/or electric vehicle connected to the charging station is/are designed for the maximum current.

9. The charging system according to claim 7, wherein the charging station receives a charging request according to a charge profile from a charging control unit, wherein the charging station checks if it is able to provide the maximum charging current known from the charge profile, and wherein the charging station, in the event of a positive check, signals its readiness to charge to the charging control unit.

10. The charging system according to claim 1, wherein the calculation means receive the information on the determined electrical energy and from this information calculates billing-relevant data.

11. A method for operating a charging system, comprising,
detecting a state of charge of a battery;
determining the slope of a charging curve for the battery based on the detected state of charge of the battery; and
calculating a charge profile, which is formed from at least two time intervals with a respective interval-specific constant electric power;
wherein the charging curve defines the respective electrical power within a time interval, wherein the respective products of time per interval and interval specific power are summed over at least two intervals and determine the resulting energy therefrom and information about the determined energy is provided, and wherein the charging curve envelopes the charge profile, such that at the end of each interval the interval specific powers equals the power provided by the charging curve.

12. The method according to claim 11, wherein the charging curve envelopes the charge profile.

13. The method according to claim 11, wherein the electric energy per time interval determined from the charge profile per time interval corresponds approximately to the electrical energy determined from the charging curve for the corresponding time interval.

14. The method according to claim 11, further comprising the step of determining the power stages of a charging control unit, wherein the charge profile per time interval contains an electrical power corresponding to one of the power stages determined.

\* \* \* \* \*